(12) United States Patent
Bubendorf et al.

(10) Patent No.: US 12,269,102 B2
(45) Date of Patent: Apr. 8, 2025

(54) METHOD FOR MANUFACTURING A CUTTING TOOL WITH LUBRICATION ORIFICES OF COMPLEX SHAPES AND CUTTING TOOL WITH LUBRICATION ORIFICES OF COMPLEX SHAPES

(71) Applicant: Comadur SA, Le Locle (CH)

(72) Inventors: Denis Bubendorf, Bevaix (CH); Pierry Vuille, Les Emibois (CH); Eric Thionnet, Le Russey (FR); Paulo Arede, La Chaux-de-Fonds (CH)

(73) Assignee: Comadur SA, Le Locle (CH)

( * ) Notice: Subject to any disclaimer, the term of this patent is extended or adjusted under 35 U.S.C. 154(b) by 553 days.

(21) Appl. No.: 17/644,860

(22) Filed: Dec. 17, 2021

(65) Prior Publication Data
US 2022/0266359 A1    Aug. 25, 2022

(30) Foreign Application Priority Data
Feb. 22, 2021   (EP) ..................................... 21158333

(51) Int. Cl.
*B23C 5/28*    (2006.01)
*B22F 3/10*   (2006.01)
(Continued)

(52) U.S. Cl.
CPC .................. *B23C 5/28* (2013.01); *B22F 3/10* (2013.01); *B22F 3/225* (2013.01); *B22F 5/00* (2013.01);
(Continued)

(58) Field of Classification Search
CPC .......... B22F 2005/001; B22F 2003/242; B22F 2003/247; B22F 3/10; B22F 2005/004;
(Continued)

(56) References Cited

U.S. PATENT DOCUMENTS 3,085,453 A * 4/1963 Mossberg ............... B23B 51/06
411/386
4,704,055 A * 11/1987 Guhring .................. B23B 51/06
408/230
(Continued)

FOREIGN PATENT DOCUMENTS

CN    104968882 A    10/2015
CN    108003294 A    5/2018
(Continued)

OTHER PUBLICATIONS

European Search Report for EP 21 15 8333 dated Aug. 20, 2021.

*Primary Examiner* — Jeffrey M Wollschlager
(74) *Attorney, Agent, or Firm* — Sughrue Mion, PLLC

(57) ABSTRACT

A method for manufacturing a cutting tool (10) with lubrication orifices of complex shapes, including the steps of: producing a polymer insert (20), overmoulding a body of the cutting tool (10) with the polymer insert (20) by injecting into a mould, removing the polymer insert (20), so as to form in the body of the cutting tool (10) lubrication orifices, the shape whereof is complementary with that of a part of the insert (20), machining the body of the cutting tool (10) on an active part thereof, and depositing an abrasive coating on a surface of the active part of the body of the cutting tool (10).

7 Claims, 1 Drawing Sheet

(51) Int. Cl.
*B22F 3/22* (2006.01)
*B22F 3/24* (2006.01)
*B22F 5/00* (2006.01)
*B23P 15/28* (2006.01)
*B24B 55/02* (2006.01)
*B24D 18/00* (2006.01)
*B29C 64/10* (2017.01)
*B33Y 10/00* (2015.01)
*B33Y 80/00* (2015.01)

(52) U.S. Cl.
CPC .............. *B23C 5/281* (2022.02); *B23P 15/28* (2013.01); *B24B 55/02* (2013.01); *B24D 18/0009* (2013.01); *B22F 2003/242* (2013.01); *B22F 2003/247* (2013.01); *B22F 2005/001* (2013.01); *B22F 2005/004* (2013.01); *B22F 2998/10* (2013.01); *B22F 2999/00* (2013.01); *B29C 64/10* (2017.08); *B33Y 10/00* (2014.12); *B33Y 80/00* (2014.12)

(58) Field of Classification Search
CPC .. B22F 2998/10; B22F 2999/00; B22F 3/225; B22F 5/00; B23P 15/28–52; B24D 18/0009; B23C 5/28; B23C 5/281; B29C 33/38; B29C 33/3842; B29C 33/40; B29C 33/485; B29C 33/52; B29C 64/10; B29L 2031/28; B29L 2031/72; B29L 2031/736; B33Y 10/00; B33Y 80/00; B24B 55/02

See application file for complete search history.

(56) References Cited

U.S. PATENT DOCUMENTS

| | | |
|---|---|---|
| 5,075,114 A | 12/1991 | Roche |
| 10,010,948 B1 | 7/2018 | Hayden et al. |
| 2007/0000410 A1* | 1/2007 | Pitamitz .................. B22C 9/105 106/38.22 |
| 2009/0283089 A1* | 11/2009 | Sung .................... E21B 10/5676 51/309 |
| 2010/0116913 A1* | 5/2010 | Suzuki .................... B22F 1/107 428/458 |
| 2016/0263666 A1* | 9/2016 | Myers ....................... B23C 5/28 |
| 2018/0304381 A1* | 10/2018 | Hayden ...................... B23C 5/28 |
| 2019/0022759 A1* | 1/2019 | Kumar .................... E21B 10/46 |

FOREIGN PATENT DOCUMENTS

| | | |
|---|---|---|
| JP | 50-7783 A | 1/1975 |
| JP | 06-316536 A | 11/1994 |
| JP | 07-299752 A | 11/1995 |
| JP | 2006-100597 A | 4/2006 |

* cited by examiner

| 300 | Producing insert |
| 310 | Overmoulding |
| 320 | Removing insert |
| 330 | Sintering |
| 340 | Machining |
| 350 | Depositing coating |

METHOD FOR MANUFACTURING A CUTTING TOOL WITH LUBRICATION ORIFICES OF COMPLEX SHAPES AND CUTTING TOOL WITH LUBRICATION ORIFICES OF COMPLEX SHAPES

CROSS REFERENCE TO RELATED APPLICATION

This application claims priority to European Patent Application No. 21158333.1 filed Feb. 22, 2021, the entire contents of which are incorporated herein by reference.

TECHNICAL FIELD OF THE INVENTION

The invention relates to the field of mechanical machining, and particularly the field of machining tools and accessories. The invention relates more specifically to a method for manufacturing a cutting tool with lubrication orifices of complex shapes and a cutting tool with lubrication orifices of complex shapes.

The cutting tool according to the invention is particularly intended for machining a part, in particular, a horological component.

TECHNOLOGICAL BACKGROUND

In the field of mechanical machining, the aim of lubrication is, on one hand, to lubricate the interface between the cutting tool and the machined part to reduce friction, and, on the other, to cool said interface. Another aim of lubrication is to evacuate chips as the cutting operation progresses, i.e. during machining. Overall, lubrication enables effective machining.

Some cutting tools include internal lubrication orifices in order to increase the effects of lubrication during machining.

Cutting tools including a body wherein lubrication orifices are machined, such as a through axial hole and channels extending radially between the hole and the active surface of the cutting tool, are known from the prior art.

The body is generally made of high-strength steel and a galvanic deposit of abrasive grains is produced on the active surface.

These tools particularly have the drawback of being very complex and very costly to produce. Indeed, the constituent material thereof being hard, the machining thereof is complex.

Furthermore, the hardness of high-strength steels limits the machining of these cutting tools, and particularly of the lubrication orifices thereof, to producing relatively simple shapes.

For these reasons, the use of these cutting tools having lubrication orifices is quite limited. For example, they are limited to use in grinding applications, for parts made of materials having a hardness below a certain threshold only.

SUMMARY OF THE INVENTION

The invention solves the drawbacks cited above by proposing a solution for producing a cutting tool wherein the body has lubrication orifices of complex shapes.

To this end, the present invention relates to a method for manufacturing a cutting tool with lubrication orifices of complex shapes characterised in that it includes the steps of:
producing 320 a polymer insert,
overmoulding 310 a body of the cutting tool with the polymer insert by injecting into a mould,
removing 320 the polymer insert, so as to form in the body of the cutting tool lubrication orifices, the shape whereof is complementary with that of a part of the insert,
sintering 330 the body of the cutting tool 10,
machining 340 the body of the cutting tool on at least one part referred to as the "active part",
depositing an abrasive coating 350 on a surface of the active part of the body of the cutting tool, said surface being referred to as the "active surface".

Thanks to these features, the lubrication orifices can have complex containing shapes.

Thus, novel hard materials, the machining whereof proved to be too complex or onerous, or even impossible, with existing cutting tools can be machined with a cutting tool according to the present invention. Such hard materials consist for example of ceramics, such as silicon nitride, zirconium oxide, or of sapphire, alumina or any hard metal.

Furthermore, the cutting tools according to the present invention can be used to perform milling operations on hard materials, unlike the cutting tools of the prior art, as the lubrication orifices can be produced so as to optimise said lubrication.

In specific implementations, the invention may further include one or more of the following features, taken in isolation or according to any technically possible combinations.

In specific implementations, the insert is made of a polymer chosen from plasticised Polyvinyl butyral (known as the acronym "PVB"), plasticised Cellulose Acetate Butyrate (known as the acronym "CAB"), and Polybutyl methacrylate acrylic resin (known as the acronym "PBMA").

In specific implementations, the step of removing 320 the insert is implemented by introducing the insert into a bath.

In specific implementations, the insert is produced by an additive manufacturing method.

According to a further aim, the present invention relates to a cutting tool that can be produced by implementing a method as described above, said cutting tool comprising a body including lubrication orifices and having a gripping part intended to be fastened to a tool-holder chuck and an active part including an active surface. Helical grooves extend along the active surface, said grooves being connected to a central hollow extending axially into the body of the tool via radial channels. Said central hollow extends between a lubricant intake opening opposite a lubricant discharge opening.

In specific embodiments, the peripheral grooves extend helically between a first end opening onto a free end of the cutting tool and a second end opening in the vicinity of the gripping part of the cutting tool, i.e. closer to the gripping part than to the free end of the cutting tool.

In specific embodiments, the discharge opening is configured so as to generate a Venturi effect.

In specific embodiments, the active surface has substantially a revolving cylindrical shape including a peripheral surface and an end surface, said end surface defining the free end of the body of the cutting tool. The discharge opening opens onto a recess, said cutting tool comprising end grooves extending radially on the end surface, from the recess to the peripheral surface.

In specific embodiments, each radial channel extends lengthwise along a direction forming an acute angle with a longitudinal axis of the body of the cutting tool, the angle being oriented towards the free end of said body of the cutting tool.

Preferably, the radial channel extends along a direction forming a 45 degree angle, plus or minus 10 degrees, with the longitudinal axis of the body of the cutting tool.

This feature is advantageous in that it enables better distribution of the lubricant around the body of the cutting tool.

In specific embodiments, each radial channel extending lengthwise has a helical shape.

This feature enables further improvement of distribution of the lubricant around the body of the cutting tool.

BRIEF DESCRIPTION OF THE FIGURES

Further features and advantages of the invention will emerge on reading the following detailed description given by way of non-limiting example, with reference to the appended drawings wherein.

DETAILED DESCRIPTION OF THE INVENTION

The present invention relates to a method for manufacturing a cutting tool 10 with lubrication orifices of complex shapes and a cutting tool 10 with lubrication orifices of complex shapes.

In the present description, a preferred application of the invention is described, wherein the cutting tool 10 is a machining, for example grinding, tool, intended to be rotated to machine a part.

Figure 1:
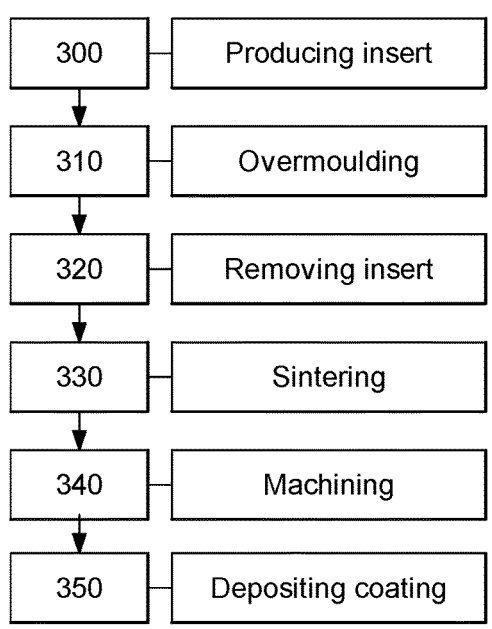
FIG. 1 represents a logic diagram of an implementation example of the method for manufacturing a cutting tool with lubrication orifices of complex shapes according to the invention.

As shown in the logic diagram in FIG. 1, the method according to the present invention includes a preliminary step of producing 320 an insert 20 made of polymer material.

Figure 2:
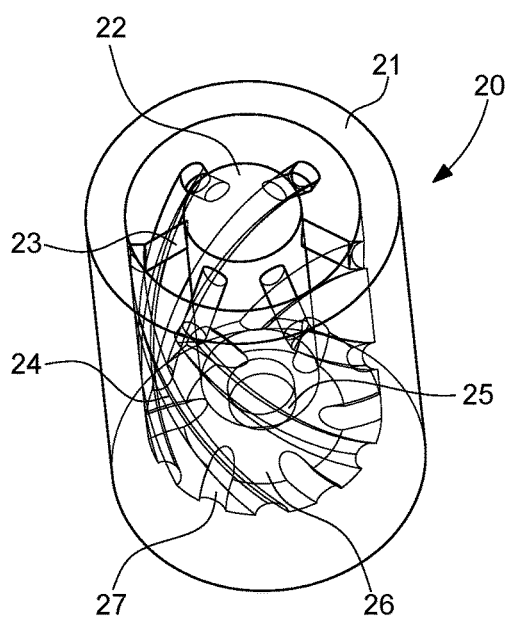
FIG. 2 represents a perspective view of an embodiment example of an insert for implementing the method in FIG. 1.

The insert 20 is illustrated in a preferred embodiment example in FIG. 2, and is produced, for example by moulding or by additive manufacturing, so as to have a negative shape of that of all or part of a body of the cutting tool 10.

In other words, the insert 20 has a shape such that it is complementary with that of the body of the cutting tool 10 which is intended to be manufactured by the method according to the invention.

In other words again, the shape of the insert 20 is defined according to the sought shape of the cutting tool 10, given that the sought shape of the cutting tool 10 is obtained by subtracting the shape of the insert 20, as described in more detail hereinafter.

The insert 20 is made of polymer material, for example of plasticised Polyvinyl butyral (known as the acronym "PVB"), plasticised Cellulose Acetate Butyrate (known as the acronym "CAB"), and Polybutyl methacrylate acrylic resin (known as the acronym "PBMA").

Figure 4:
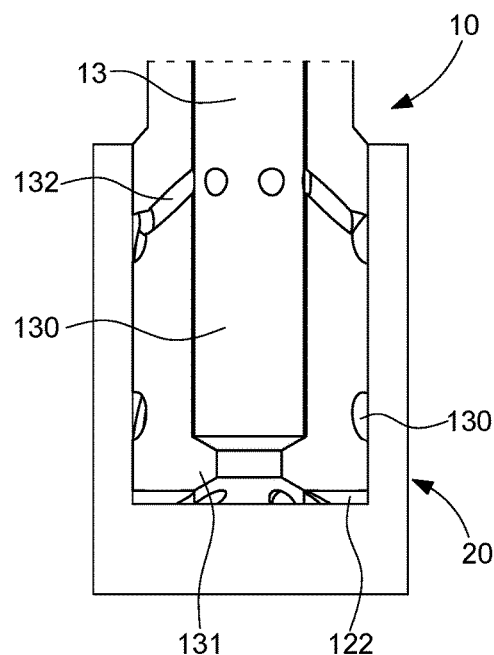
FIG. 4 represents a transverse sectional view of the cutting tool in FIG. 3 on which the insert in FIG. 2 is overmoulded.

Once the insert 20 has been produced, the body of the cutting tool 10 is overmoulded with said insert 20 during an overmoulding step 310 represented in the sectional view in FIG. 4. More specifically, during this overmoulding step 310, a previously produced powder mixture, for example of Tungsten or other metals, and binder, for example polymer or metallic, is injected into a mould wherein the insert 20 is disposed.

The powder and the binder are advantageously chosen so as to form a tool body of hard metallic material, once the overmoulding step 310 has been completed.

Then, a step of removing 320 the insert 20 is carried out, so as to form in the body of the cutting tool 10 lubrication orifices, the shape whereof is complementary with that of a part of the insert 20.

During this step of removing 320 the insert 20, the assembly resulting from the overmoulding step 310, i.e. the insert 20 and the cutting tool 10 cooperating with one another, is introduced into a bath, preferably of alcohol heated to 80° C.

The alcohol bath has the effect of dissolving the insert 20 so as to obtain only the cutting tool 10.

It is worth noting that any method capable of removing the constituent material of the insert 20 without degrading the constituent material of the cutting tool 10 can be implemented in the step of removing 320 the insert 20.

The manufacturing method according to the invention then includes a step of sintering 330 the body of the cutting tool 10, consisting of heating said body of the cutting tool 10 so as to form the cohesion of the constituent material and harden it.

The body of the cutting tool 10 is of substantially cylindrical shape and extends along a longitudinal axis. It includes a first part 11 intended to be fastened to a tool-holder chuck, connected to a second part 12 intended to be in contact with the part to be machined. The first part 11 is referred to here as "gripping part" 11 and the second part 12 is referred to as "active part" 12, said active part 12 including an external surface referred to as "active surface".

Figure 3:
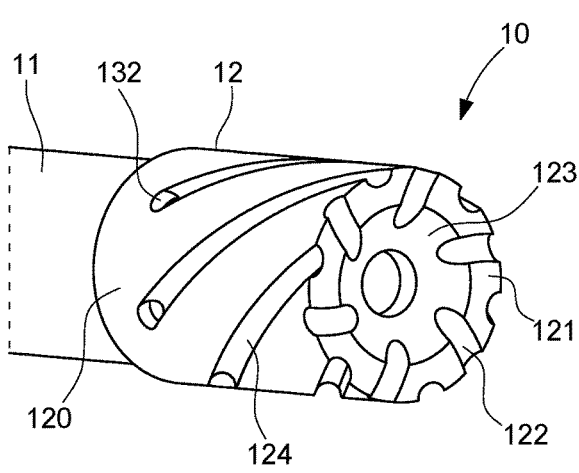
FIG. 3 represents a perspective view of an embodiment example of a cutting tool obtained by implementing the method in FIG. 1.

As shown in FIG. 3, at least the active part 12 of the body of the cutting tool 10 advantageously includes lubrication orifices after the step of removing 320 the insert 20, said orifices being of complementary shapes with those of portions of the insert 20 described in detail hereinafter, insofar as they are generated by subtracting said portions in the body of the cutting tool 10.

Thus, the lubrication orifices can have complex shapes, according to the shapes adopted by said portions of the insert 20.

It is worth noting that the shape of the insert 20, and in particular of said portions of the insert 20, can be very complex when the latter is produced by additive manufacturing.

The active part 12 of the body of the cutting tool 10 is then machined during a step of machining 340 the body of the cutting tool 10.

During this step, the active part 12 is trued so as to obtain a suitable surface condition for carrying out a step of depositing an abrasive coating 350, wherein the active surface of the body of the cutting tool 10 is covered with a coat of abrasive for example by galvanic deposition.

The gripping part 11 can be machined during the machining step so as to be adapted to cooperate in fastening with a tool-holder chuck.

Alternatively, the mould can be of a shape such that the gripping part 11 is moulded during the overmoulding step 310.

Preferably, the active surface has substantially a revolving cylindrical shape including a peripheral surface 120 and an end surface 121, said end surface 121 defining the free end of the body of the cutting tool 10, as shown in the perspective view in FIG. 3.

Also, in the preferred embodiment example represented in the figures, the insert 20 is shaped such that the cutting tool 10 has at least in the active part thereof, a central hollow 13 of circular cross-section extending axially inside the body of the tool, between a first opening (not shown in the figures) intended to receive lubricant, referred to as "intake opening", located towards or in the gripping part 11 of the tool, and a second opening, referred to as "discharge opening" 130, intended to discharge the lubricant, opening onto the free end.

The discharge opening 130 is advantageously configured so as to generate a Venturi effect. For this purpose, the central hollow 13 has, at the discharge opening 130, a radial lip 131 arranged so as to progressively reduce the cross-section of said central hollow 13, as shown in the sectional view in FIG. 4.

Advantageously, the discharge opening 130 opens onto the free end via a recess 123, such that the cross-section of the central hollow 13 progressively increases from the lip 131 to said free end. The technical effects of these features are described hereinafter.

Advantageously, the active part includes end grooves 122 extending radially on the end surface 121, from the recess 123 to the peripheral surface 120. These end grooves 122 are distributed angularly about the longitudinal axis of the body of the cutting tool 10 in a regular fashion, as represented in FIG. 3.

The end grooves 122 make it possible to homogeneously radially distribute the flux of lubricant expelled by the discharge opening 130 during the operation of the cutting tool 10.

Also advantageously, as also shown in FIG. 3, the active part includes peripheral grooves 124 extending helically on the peripheral surface 120, between a first end opening onto the free end of the cutting tool 10, i.e. on the end surface 121, and a second end opening in the vicinity of the gripping part 11 of the cutting tool 10. In other words, the second end of the peripheral grooves 124 is closer to the gripping part 11 than the free end of the cutting tool 10.

These peripheral grooves 124 are distributed angularly in a regular fashion about the longitudinal axis of the body of the cutting tool 10.

As illustrated in FIGS. 3 and 4, the cutting tool 10 comprises radial channels 132 connecting the central recess 13 to the peripheral grooves 124. More specifically, the cutting tool 10 includes the same number of radial channels 132 as peripheral grooves 124, each radial channel 132 opening onto the second end of a peripheral groove 124.

The term channel defines in the present document a radially closed and axially opening conduit.

Thus, during the rotation of the cutting tool 10, during the operation of the cutting tool 10, a portion of the lubricant circulating in the central recess 13 is expelled by the radial channels 132, generating a flux of lubricant in each of the peripheral grooves 124.

These features help optimise the lubrication and cooling of the cutting tool 10 and of the machined part, and therefore enable machining of parts made of very hard materials, of ceramic type, such as silicon nitride, zirconium oxide, etc., or sapphire or other stones, or any hard metal.

The fact that the second end of the peripheral grooves 124 is closer to the gripping part 11 than the free end of the cutting tool 10 makes it possible to ensure that the majority or entirety of the active surface is lubricated during the operation of the cutting tool 10.

Preferably, each radial channel 132 extends lengthwise along a direction forming an acute angle, for example 45 degrees, with the longitudinal axis of the body of the cutting tool 10, said acute angle being oriented towards the free end of said body of the cutting tool 10.

In another example, the angle may be of a value between 35 and 55 degrees.

This feature is advantageous in that it enables better distribution of the lubricant around the body of the cutting tool 10.

More preferably, the direction along which each radial channel 132 extends lengthwise has a helical shape. In other words, each channel has a curved shape.

This feature enables further improvement of distribution of the lubricant around the body of the cutting tool 10, and thus helps limit the temperature rise at the interface between the cutting tool 10 and the machined part further, during machining, which helps prevent premature wear of the galvanic deposit.

The lip 131 has the effect of increasing the expulsion pressure of the lubricant expulsion pressure at the discharge opening 130 and thus of reducing or eliminating the lubricant pressure loss in the central hollow 13 generated by the radial channels 132. The recess 123 has for its part the effect of ensuring homogeneous radial distribution of the expelled lubricant flux.

In the present embodiment example of the invention and as illustrated in particular in FIG. 2, the insert 20 has a body of the insert 20 in the form of a blind hollow tube 21 of circular cross-section intended to contain and form the body of the cutting tool 10.

The hollow tube 21 is connected to a central shaft 22 intended to form the central hollow 13, by radial shafts 23 intended to form radial channels 132.

The insert 20 also includes an addendum 24 extending helically on an internal peripheral face of the hollow tube 21, from each radial shaft 23 to an internal face of a bottom wall of said hollow tube 21. The addenda 24 are intended to form peripheral grooves 124.

The central shaft 22 includes, at the end whereby it is connected to the bottom wall, a decrease in cross-section defining a radial groove 25 intended to form the lip 131.

The radial groove 25 is connected to the internal face of the bottom wall by a neck-moulding 26 intended to form the recess 123.

Finally, addenda 27 extend radially on the internal face of the bottom wall, from the neck-moulding 26 to the internal peripheral face 120 of the hollow tube 21. These addenda 27 are intended to form end grooves 122 when carrying out the manufacturing method according to the invention.

It is worth noting that the present invention can be applied to a cutting tool intended to carry out drilling, milling operations or any other mechanical machining operation and to the method of this cutting tool.

The invention claimed is:

1. A method for manufacturing a cutting tool with lubrication orifices, comprising the following steps:
   producing a polymer insert made of plasticised polyvinyl butyral, plasticised cellulose acetate butyrate, or polybutyl methacrylate acrylic resin,
   overmoulding a body of the cutting tool with the polymer insert by injecting into a mould,
   forming cutting tool lubrication orifices in the body of the cutting tool by removing the polymer insert, the shape of the body and the cutting tool lubrication orifices are complementary with that of a part of the insert, the cutting tool lubrication orifices comprising a central hollow, discharge openings, radial channels extended from intake openings inside of the body at the central hollow and to first ones of the discharge openings at an outside of the body, and peripheral grooves extended along the outside of the body and to a free end of the body, the free end of the body being a longitudinal end of the body, and a second one of the discharge openings is open, at a center of a concave portion of the free end, from the central hollow to the outside of the body, sintering the body of the cutting tool, machining the body of the cutting tool on an active part of the body, and depositing an abrasive coating on a surface of the active part of the body of the cutting tool.

2. The manufacturing method according to claim 1, wherein the step of removing the insert is implemented by introducing the insert into a bath.

3. The manufacturing method according to claim 1, wherein the insert is produced by an additive manufacturing method.

4. The manufacturing method according to claim 1, wherein the peripheral grooves are spiraled around the central hollow, at the outside of the body, and radially along a direction from a second longitudinal end of the body to the longitudinal end of the body.

5. The manufacturing method according to claim 4, wherein, at the longitudinal end of the body, the body comprises the concave portion, wherein first longitudinal ends of the peripheral grooves, along a longitudinal length of the body, are terminated at the longitudinal end, wherein an innermost portion of the concave portion comprises the second one of the discharge openings.

6. The manufacturing method according to claim 5, wherein the longitudinal end of the body comprises end grooves extended from the concave portion and towards the peripheral grooves.

7. The manufacturing method according to claim 6, wherein the polymer insert comprises a lip having a shape complementary to a portion of the body from the central hollow to the concave portion, the portion, along the longitudinal length of the body, is narrowed from the central hollow towards an outermost portion of the concave portion, and is expanded from an innermost portion of the concave portion to the outermost portion of the concave portion.

* * * * *